Oct. 10, 1950 J. B. ATWOOD ET AL 2,525,634

PULSE COMMUNICATION SYSTEM

Filed Dec. 7, 1945 3 Sheets-Sheet 1

INVENTORS
John B. Atwood &
Grant E. Hansell
BY H. S. Grover
ATTORNEY

INVENTORS
John B. Atwood &
Grant E. Hansell
BY H. S. Grover
ATTORNEY

INVENTORS
John B. Atwood &
Grant E. Hansell
BY H. S. Grover
ATTORNEY

Patented Oct. 10, 1950

2,525,634

UNITED STATES PATENT OFFICE 2,525,634

PULSE COMMUNICATION SYSTEM

John B. Atwood and Grant E. Hansell, Riverhead, N. Y., assignors to Radio Corporation of America, a corporation of Delaware Application December 7, 1945, Serial No. 633,465

11 Claims. (Cl. 250—20)

This invention relates generally to pulse systems, such as communication systems employing pulses of electrical energy, and particularly to the receiving end of a pulse communication system.

It is known to transmit equal duration pulses of radio frequency energy, and to modulate the occurrence time (either phase or frequency modulation) of the pulses in accordance with the signal to be transmitted. At the receiver, it is known to convert the radio frequency pulses to video or direct current pulses. In order to remove noise ripples from the direct current pulses and from the spaces between the pulses, it has been proposed to pass the rectified pulses through clipper circuits which remove noise and variations above and below certain limits. These clipper circuits, in effect, remove a horizontal slice from the direct current pulses as a result of which there are obtained pulses of constant amplitude.

However, it has not been appreciated heretofore that the clipped pulses of constant amplitude vary in width due to the effect of noise, and that these undesired width variations often completely obscure the desired phase variation effect of the pulses in the apparatus which follows the clipper circuits in known systems.

Figure 1:
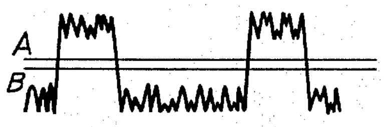

A better understanding of this phenomenon may be had by referring to Fig. 1, which graphically illustrates the appearance of direct current pulses in the output of the rectifier in a pulse receiving system. It should be noted that these pulses have ripples or undesired current variations and that these ripples also appear in the spaces between pulses. These ripples are caused by noise and variations of an interfering character. In order to remove these ripples, it has been known to pass these direct current pulses through top and bottom clipper circuits which utilize only a slice or portion of the pulses from the center of the pulses between the two horizontal lines A and B. This can be done as long as the pulse amplitude is above the threshold level which is defined as the point where the peak amplitude of the pulse is twice the peak amplitude of the noise.

These clipper circuits may be any type known in the art, and preferably comprise a pair of vacuum tubes in cascade, each biased by means of a high resistance coupling resistor. The first of these tubes has its grid supplied with a pulse of positive polarity from the preceding rectifier and passes only a certain positive portion of the applied rectified (direct current) pulse. This positive portion saturates the tube so that the output therefrom is of substantially direct current for the duration of the pulse. Since the output from this first tube is in the negative direction, it is necessary to invert the polarity thereof by means of a transformer whose output supplies a positive pulse to the grid of the second tube of the pair. This second tube removes any amplitude variations not removed by the first tube. It is thus possible to clip the incoming pulse between two levels and remove a desired portion of the incoming pulse.

Figure 2:
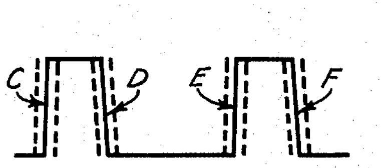

Fig. 2 shows the pulses taken from the amplified output of the clipper circuits. These pulses are of constant amplitude but are variable in width due to the effect of noise. The solid line edges C, D and E, F represent the boundaries of the pulses in the absence of noise. Because random noise causes the time of occurrence of the leading and trailing edges of the pulses of Fig. 1 to vary, it will be evident that the width of the horizontal slice taken from these pulses between levels A and B will also vary. This variation in the time of occurrence of the edges of the pulses of Fig. 1 manifests itself in small phase variations in the edges of the clipped pulses of Fig. 2. The dotted lines of Fig. 2 show the extremes of the width variation of the pulses at their edges.

An object of the present invention is to eliminate the effect of undesired width variations in recurring pulses without deleteriously affecting any phase variation of the pulse as a whole which may be present due to modulation.

Another object is to provide a simplified receiving system for receiving timing modulated pulses and which eliminates the need for the conventional band pass filter, limiter and discriminator circuits.

A further object is to provide a pulse receiving system capable of removing undesired width variations from the received pulses, and which is adjustable by a simple manipulation to receive pulses of different repetition rates.

Figure 3:
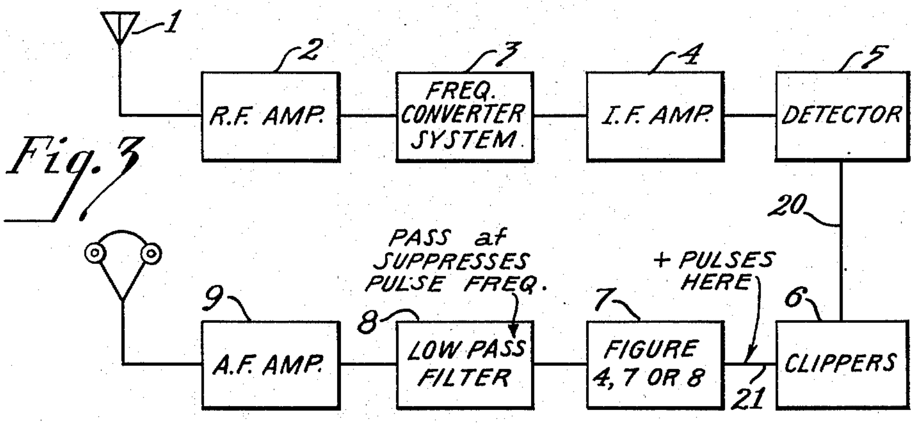
Figure 4:
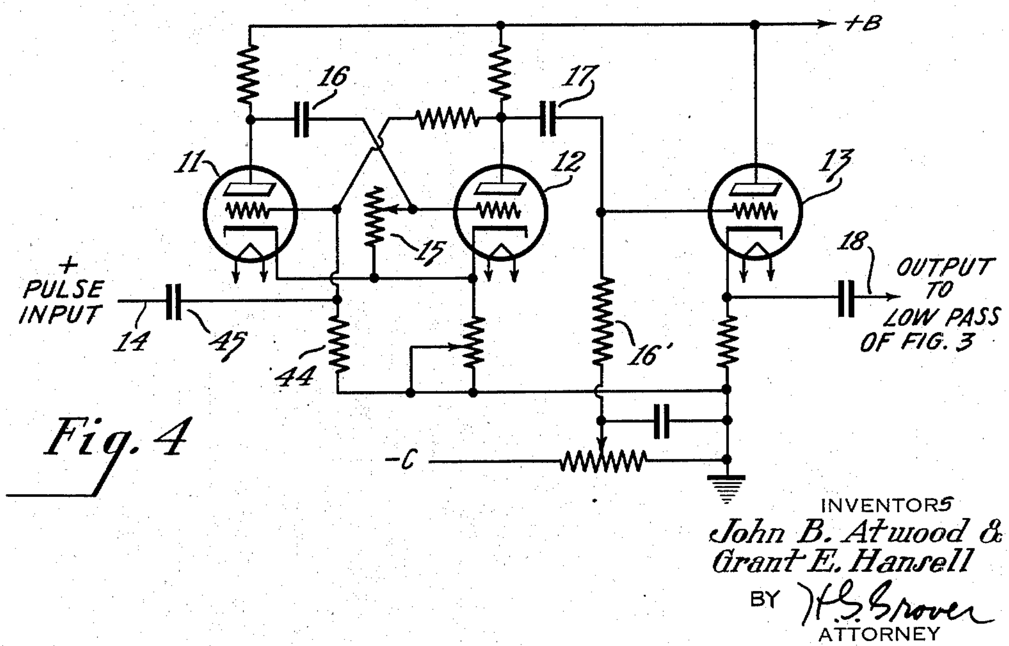

Other objects of the invention will appear from a reading of the following description which is accompanied by a drawing, wherein:

Figs. 1 and 2 graphically illustrate a series of pulses before and after passing through the clipper circuits, given for the purpose of explaining the phenomenon involved;

Fig 3 shows, in box form, the receiver of the invention;

Fig. 4 schematically illustrates one embodiment of a circuit used in the invention for separating the undesired width modulation effects of the clipped pulses from the desired frequency or phase modulation effects.

Figure 5A:
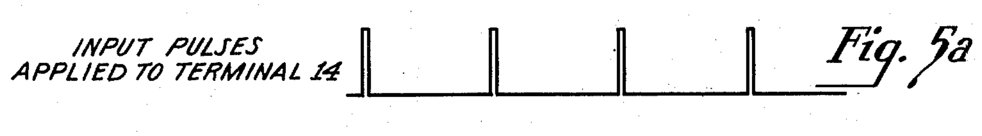
Figure 5B:
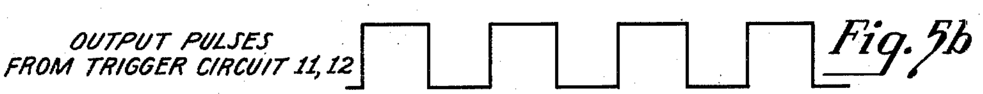
Figure 5C:
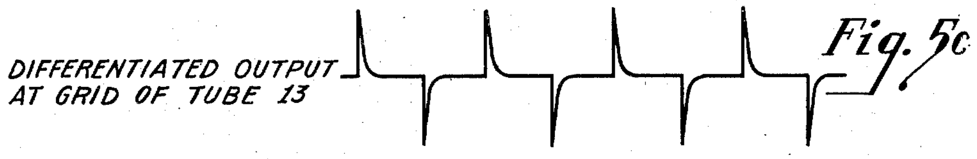
Figure 5D:
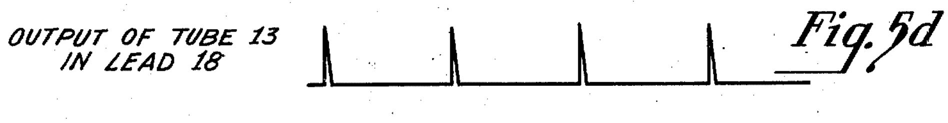
Figure 6A:
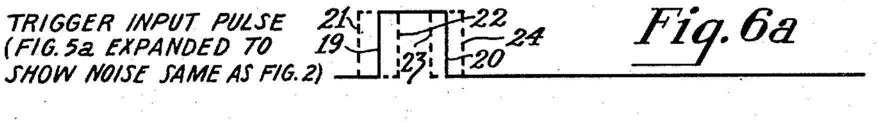
Figure 6B:
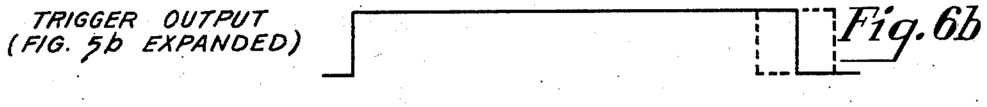
Figure 6C:
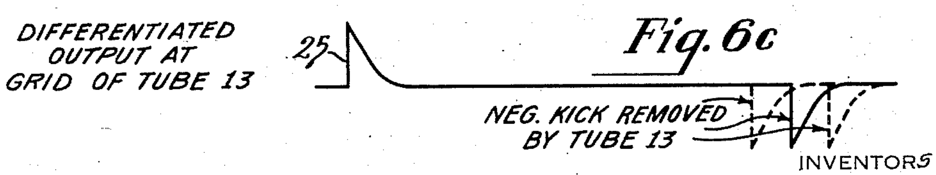
Figure 7:
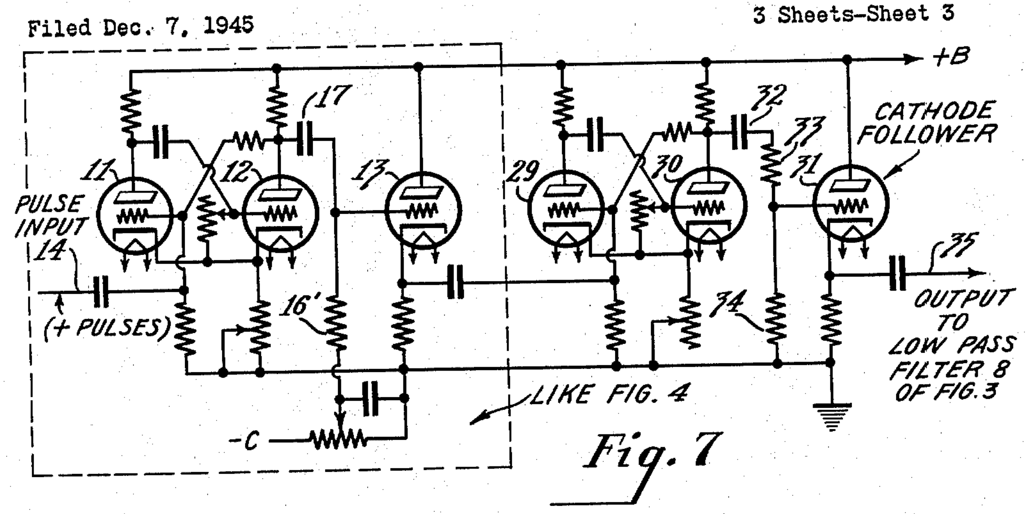
Figure 8:
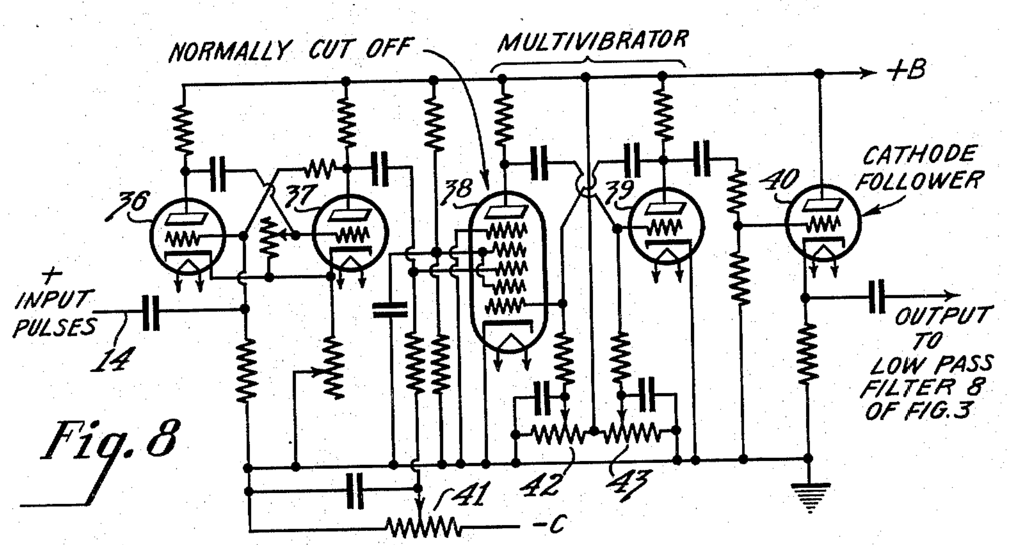

Figs. 5*a* to 5*d*, inclusive, graphically illustrate the operation of the circuit of Fig. 4;

Figs. 6*a* to 6*c*, inclusive, also graphically illustrate the operation of the circuit of Fig. 4, but the pulses of Figs. 6*a* to 6*c* are expanded or magnified relative to those of Figs. 5*a* to 5*d*;

Figs. 7 and 8 show other embodiments of the invention; and

Figure 9A:
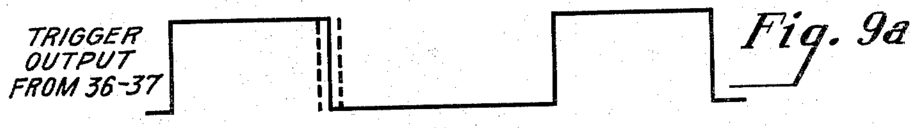
Figure 9B:
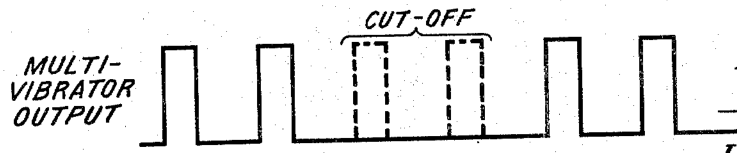

Figs. 9*a* and 9*b* are graphs given to explain the operation of the system of Fig. 8.

Referring to Fig. 3 showing one embodiment of the receiver of the invention, incoming pulses whose phase or frequency is modulated by the signal and wherein average energy contained in the pulses varies in accordance with the modulation over a half cycle of such modulation are received on antenna 1, amplified by radio frequency amplifier 2, converted to intermediate frequency by frequency converter 3, amplified by intermediate frequency amplifier 4 and detected by detector 5. These incoming pulses may correspond to pulses of constant amplitude and constant duration radiated from a remote transmitter. By way of example only, the pulse repetition rate or frequency of the received pulses may be anywhere in the range from 10 kc. to 30 kc. while the highest audio modulation may be 3500 cycles per second. The output of detector 5 appears in lead 20 and consists of video pulses and noise as in Fig. 1. These are passed through the clippers 6 and the output of these clippers appears in lead 21 and consists of positive polarity pulses which look like those shown in Fig. 2. Following the clippers is one of various separator circuits 7 which will be described shortly. The term "separator circuit" is used to designate the circuits which separate the desired frequency or phase modulation effect from the undesired width modulation effect. Separator circuit 7 is followed by the low pass filter 8 which passes the audio modulation frequencies and suppresses the higher pulse repetition frequency. Low pass filter 8 acts as an integrating device of the energy supplied thereto when the energy is in the form of pulses having a repetition rate higher than the cut-off frequency of the filter. Low pass filter 8, in turn, is followed by the audio amplifier 9 and electric-acoustic transducer which may be headphones, a loudspeaker or a suitable recording device.

Fig. 4 shows in detail the simplest embodiment of the separator circuits. It consists of three vacuum tubes 11, 12 and 13. Tubes 11 and 12 and their associated components comprise a self-restoring trigger circuit having one degree of freedom. In the stable state of the trigger circuit, tube 12 is normally conducting and tube 11 is normally cut off. In the active state of the trigger circuit, the current passing conditions of these two tubes are reversed. Short duration positive pulses from the clipper circuits are applied to the input lead 14. This input lead 14 is connected via condenser 45 to the grid of normally cut-off tube 11. The grid of tube 11 is also connected to ground through a resistor 44. Each of these pulses trips or triggers the circuit from its stable state to its active state. Once the trigger circuit 11, 12 is tripped, it remains in the active state for a period of time which is a function of the time constant of R.-C. combination of resistor 15 and condenser 16. The time constant is adjusted by means of variable resistor 15 so that the trigger will restore itself to normal (i. e., to the stable state) before the next positive input pulse appears on input lead 14.

The output of the trigger circuit 11, 12 is taken from the anode of tube 12 and consists of a series of relatively long pulses. These are differentiated by the R.-C. combination of resistor 16' and condenser 17, and fed to the grid of output vacuum tube 13. This tube is so biased to cut-off as to remove the negative pulses produced by the differentiation and the resultant output appears at output terminal 18. These various conditions are illustrated by Figs. 5*a* to 5*d*. Stated in other words, tube 13 is an impedance changer which passes only the positive peaks of the differentiated pulses. The grid circuit of tube 13 is a relatively high impedance circuit, while the cathode circuit of tube 13 is a low impedance circuit. Tube 13 also acts as a buffer to isolate the trigger circuit from the output circuit.

Fig. 5*a* shows relatively short duration direct current input pulses of positive polarity which are applied to input lead 14 in order to trip or activate the trigger circuit from its stable state to its active state. These positive pulses are applied to the grid of normally non-conductive vacuum tube 11 and are of such magnitude as to overcome the cut-off bias on tube 11 and trip the trigger circuit.

Fig. 5*b* shows the output pulses taken from the anode of tube 12 of the trigger circuit. By way of illustration only, the output pulses are shown as being 50% mark and 50% space. It should be noted that they are rather long compared to the duration or length of the input pulses of Fig. 5*a*.

Fig. 5*c* shows the appearance of the differentiated pulses at the grid of vacuum tube 13. The starting and trailing edges of the pulses of Fig. 5*b* have been differentiated and appear as the very short sharp impulses of Fig. 5*c*.

Fig. 5*d* shows the output of tube 13 in lead 18. The output of Fig. 5*d*, it should be noted, corresponds to the short positive peaked impulses of Fig. 5*c*. Due to the fact that tube 13 is normally biased to cut-off, it will be noted that only the positive differentiated impulses are passed by this tube while the negative impulses of Fig. 5*c* do not pass through tube 13.

Fig. 6*a* illustrates a magnified or expanded form of one of the input pulses of Fig. 5*a*. The solid lines 19 and 20 of Fig. 6*a* indicate the input pulses under the noise free condition. Noise may vary the width of the input pulses so that the front edge 19 may appear anywhere between dotted lines 21 and 22, and the back edge 20 may appear anywhere between dotted lines 23 and 24.

Fig. 6*b* illustrates in expanded or magnified form the trigger output which constitutes one pulse of Fig. 5*b*.

Fig. 6*c* shows the differentiated output at the grid of tube 13 and corresponds to an expanded wave form of a positive and negative peak of Fig. 5*c*. The dotted lines in Figs. 6*b* and 6*c* illustrate the time positions of the pulses under varying noise conditions. The negative impulses or negative kick of Fig. 6*c* is removed by tube 13.

The duration of the output pulse from the trigger circuit 11, 12 is long with respect to the input pulse. By way of example only, and by way of exposition, let is be assumed that the length of the input pulse under noise free conditions is 4 microseconds and that noise can change the width by $\pm 1$ microsecond on either edge. Under these conditions, the pulse width can vary from a minimum of 2 microseconds to a maximum of 6 microseconds.

Let is further be assumed that the input pulses have a pulse repetition rate of 10 kc. If the trigger output is adjusted for 50% mark for no modulation, it will have a normal length of 50 microseconds. Within certain limits, the width of the output pulse from the trigger circuit is a function of the width of the input pulse. Thus we have approximately the following:

1. Under noise free conditions, the duration or width of the output pulse from the trigger circuit will be approximately 46+4=50 microseconds.

2. Under the condition where noise produces a minimum input pulse width, the duration or width of the output pulse from the trigger circuit will be approximately 46+2=48 microseconds.

3. Under the condition where noise produces a maximum input pulse width, the duration or width of the output pulse from the trigger will be approximately 46+6=52 microseconds.

By differentiating the trigger output pulse and biasing off the negative kick from the rear edge, there remain only the variations due to the front edge, as shown by 25 of Fig. 6*c*.

At this time, the thought may occur to the reader that the input pulse might be differentiated and the same effect obtained without using the system of Fig. 4. Although theoretically the result is possible, it has been found from a practical standpoint that the input pulses may not easily be differentiated to obtain the desired result of separating the desired frequency or phase modulation effect from the undesired width modulation effect. The reason for this is as follows: The input pulses may be normally only 0.5 microsecond long and the time constant of the differentiating circuit must be considerably shorter than this. A practical circuit to achieve this result is hard to obtain because of unavoidable vacuum tube capacities and also because of the large loss in voltage which occurs. It has been found from a practical standpoint to be much simpler to lengthen the input pulses to 50 microseconds, by way of example, and then differentiate these lengthened pulses because the time constant of the differentiating circuit can be made to be 100 times as long compared to the time constant of the differentiating circuit if the pulses to be differentiated were only .5 microsecond long.

Fig. 7 shows the preferred separator circuit embodiment of the invention. This figure consists of the circuit of Fig. 4 shown within the dotted line box and comprising a trigger circuit having vacuum tubes 11 and 12 with its associated vacuum tube 13, followed by another trigger circuit made up of vacuum tubes 29 and 30, in turn followed by a cathode follower 31. Because the elements within the dotted line box of Fig. 7 are identical to and operate in the same manner as the circuit of Fig. 4, they have been given the same reference numerals. Trigger circuit 29, 30 is similar to the trigger circuit of Fig. 4. The output of trigger circuit 29, 30 is coupled to cathode follower 31 through condenser 32 and voltage divider 33, 34. However, the time constant of this R.-C. coupling circuit composed of condenser 32 and resistors 33 and 34 is made to be quite long compared to the length of the output pulses from the trigger circuit 29, 30, so that the output at 35 is not differentiated.

The operation of Fig. 7 is then as follows. The positive pulse from the clippers is applied to input lead 14 which causes trigger circuit 11, 12 to trigger to its active state and lengthen out the input pulse. The width variation is removed by R.-C. circuit 17, 16' and the resultant negative pulse is biased off by vacuum tube 13. The positive short pulse from the cathode of tube 13 is used to trip the trigger circuit 29—30 which lengthens out the pulse applied thereto. It should be noted that there is no width variation in the applied pulse to trigger circuit 29, 30 because it was previously removed by the first circuit 11, 12, 13.

This long pulse from the output of trigger circuit 29, 30 is then fed through cathode follower 31 and output lead 35 to the low pass filter 8 of Fig. 3. The reason for the additional lengthening is again a practical matter. If the short pulse output of Fig. 4 is used, the amplitude of the modulation output from the low pass filter will be extremely low and a large amount of audio amplification will be required. This will, in general, cause a high hum level (mostly due to hum pick-up in the low pass filter) from the alternating current power supply. By feeding the low pass filter 8 with a long pulse, the modulation will be at a higher amplitude with respect to the hum pick-up because there is more energy in the longer pulse, as a result of which less audio gain will be required. Another advantage is that with less audio gain, less tendency exists for the presence of microphonics (vibration noise) in the audio amplifier.

Fig. 8 shows a third separator circuit embodiment of the invention. Tubes 36, 37 comprise a self-restoring vacuum tube trigger circuit similar to 11, 12 of Fig. 4 and having one degree of freedom. Vacuum tubes 38, 39 comprise a multivibrator having certain circuit characteristics. Tube 40 is a cathode follower whose output feeds the low pass filter 8 of Fig. 3. Tube 38 of the multivibrator is a type having two control grids, such as an RCA 6SA7 for example. One of these grids is connected to a potentiometer 41 which is used to provide negative bias so that the multivibrator 38, 39 is normally cut-off. The output of the trigger circuit 36, 37 is not differentiated in this embodiment, and the long positive pulses through this trigger circuit (compared to the short input pulses in lead 14) are used to overcome the negative bias from potentiometer 41. These relatively long positive pulses from the trigger circuit start the multivibrator oscillating and the multivibrator will continue to oscillate as long as an output pulse from the trigger circuit overcomes the negative bias. The multivibrator frequency can be adjusted by means of potentiometer 42 and the length of each of the multivibrator pulses can be adjusted by potentiometer 43. Controls 42 and 43 are somewhat interlocking. The preferred relationship between the output pulses from the trigger circuit 36, 37 and the pulse from the multivibrator is shown in Figs. 9*a* and 9*b*.

Fig. 9*a* shows the output pulse from the trigger circuit 36, 37. The dotted lines indicate variations in the length of these pulses due to noise. By referring to Fig 9*b*, it will be seen that there would be four multivibrator pulses for each of the trigger pulses applied to the multivibrator if the multivibrator were not cut-off between trigger pulses. The dotted line pulses of Fig. 9*b* indicate where certain multivibrator pulses would occur if the multivibrator were not cut off. It has been found that the number of pulses from the multivibrator is not important for the practice of the invention, but that the number shown in Fig. 9*b* provides a certain ease of circuit adjustment. If there were no cut-off bias on the multivibrator, the multivibrator would continue oscillating at a certain period. The cut-off bias produced by potentiometer 41 assures the fact that the multivibrator is cut off at time intervals between the positive input pulses produced by the trigger circuit 36, 37. The multivibrator frequency is adjusted so that the positive pulses from the trigger circuit have their trailing edges occur at time intervals substantially midway between pulses of the multivibrator. Thus, despite variations in the timing of the trailing edge of the positive output pulse from the trigger circuit, the trailing edge will always occur in the time intervals between multivibrator pulses, and any variation of the trailing edge of the trigger output pulse will not appear in the multivibrator output. Thus, the undesired variable width effect due to noise has been removed from the trigger circuit output. It will thus be evident that the number of multivibrator pulses is not important so long as enough space is left between the multivibrator pulses to allow for variations in the back edge of the trigger pulse.

An advantage of the receiver system of Fig. 3 is the fact that it does not use the band pass filter, limiter and discriminator required in conventional pulse frequency or phase modulation systems. As a result of this receiver arrangement of the invention, it is possible to obtain a deviation of ±12 kc. or more at an unmodulated pulse repetition rate of 20 kc., whereas in the more conventional system using a discriminator, the unmodulated pulse repetition rate must be centered closely on the cross-over point of the discriminator to obtain noise balance, and a discriminator for a pulse system has not been built so far as we are aware, which can accommodate a deviation much wider than 15% of the unmodulated pulse rate.

If desired, the system of Fig. 4 can be operated somewhat differently to achieve the same results. Condenser 45 and resistor 44 can be so chosen as to constitute a differentiating circuit, whereas condenser 17 and resistor 16′ in this case would have such values as not to be a differentiating circuit. Tube 13 in this case should not be normally cut off but should be operated as a cathode follower. With such an arrangement, if the input pulse at terminal 14 is long enough, the undesired width effect due to noise can be removed by differentiating with elements 45 and 44, the trigger circuit 11, 12 then functioning to lengthen out the pulses and to provide a high amplitude output to feed the low pass filter.

What is claimed is:

1. The method of receiving spaced radio frequency pulses whose phase or frequency is modulated by a signal and wherein the average energy contained in the pulses varies in accordance with such signal over a half cycle of the modulation, which includes in the order named: the steps of detecting the received pulses so as to convert them to unidirectional current pulses, eliminating extraneous and undesired current variations of an interfering character from the tops of the unidirection pulses and from the spaces between said unidirectional current pulses, lengthening said detected pulses, differentiating the lengthened pulses to produce short spaced pulses from the leading and trailing edges of the lengthened pulses, discarding those pulses produced from the trailing edges of the lengthened pulses, and directly filtering only those pulses produced from the leading edges of the lengthened pulses to thereby suppress the pulse frequency and to produce audio frequency energy having the original signal modulation.

2. The method of receiving spaced pulses of radio frequency energy, which pulses have their phase or frequency modulated by a signal and wherein the average energy contained in the pulses varies in accordance with such signal over a half cycle of the modulation, comprising the steps of converting the received pulses of radio frequency energy to pulses of intermediate frequency energy, converting said pulses of intermediate frequency energy to video pulses, eliminating extraneous and undesired current variations of an interfering character from the tops of said pulses and from the spaces between said video pulses, lengthening said video pulses, differentiating the lengthened video pulses and thereby removing from said lengthened pulses undesired width modulation effects due to noise, and directly filtering the resultant pulses by suppressing components of the pulse frequency and converting the pulses to audio frequency energy of sine wave character.

3. In a pulse modulation system wherein recurring alternating current pulses of constant amplitude and constant duration and of varying phase or frequency are transmitted and wherein the average energy contained in the pulses varies in accordance with a modulating signal over a half cycle of the modulation, a receiver arrangement including a detector for converting the received alternating current pulses to direct current pulses, a clipper stage coupled to the output of said detector for removing noise ripples from said direct current pulses, a trigger circuit coupled to the output of said clipper stage for converting said direct current pulses to longer duration spaced direct current pulses, a differentiator coupled to the output of said trigger circuit, a tube coupled to said differentiator circuit and so biased as to pass pulses of only one polarity produced by said differentiator circuit, and a low pass filter coupled to the output of said tube for converting the pulses applied thereto to audio frequency energy of sine wave character and for suppressing components of the pulse frequency.

4. In a pulse modulation system wherein recurring alternating current pulses of constant amplitude and constant duration and of varying phase or frequency are transmitted and wherein the average energy contained in the pulses varies in accordance with a modulating signal over a half cycle of the modulation, a receiver arrangement including a detector for converting the received alternating current pulses to direct current pulses, a clipper stage coupled to the output of said detector for removing noise ripples from said direct current pulses, a trigger circuit coupled to the output of said clipper stage for converting said direct current pulses to longer duration direct current pulses, means for differentiating said longer duration direct current pulses, a vacuum tube normally biased to cut-off and having a grid coupled to said differentiator circuit for passing only differentiated pulses of positive polarity, and a low pass filter coupled to the cathode of said vacuum tube for converting the pulses obtained from said vacuum tube to audio frequency of sine wave character.

5. In a pulse modulation system wherein recurring alternating current pulses of constant amplitude and constant duration, and of varying phase or frequency are transmitted and wherein the average energy contained in the pulses varies in accordance with a modulating signal over a half cycle of the modulation, a receiver arrangement including a detector for converting the received alternating current pulses to direct current pulses, a clipper stage coupled to the output of said detector for removing noise ripples from said direct current pulses, a trigger circuit coupled to the output of said clipper stage for converting said direct current pulses to longer duration direct current pulses, a differentiator circuit in the output of said trigger circuit, a vacuum tube normally biased to cut off and having a grid coupled to said differentiator circuit for passing only differentiated pulses of positive polarity, said vacuum tube also having a cathode, another trigger circuit having its input coupled to the cathode of said vacuum tube, a cathode follower coupled to the output of said last trigger circuit, and a low pass filter coupled to said cathode follower for converting the pulses obtained therefrom to audio frequency energy of sine wave character.

6. A system in accordance with claim 3, characterized in this that said trigger circuit is a self-restoring circuit having one degree of freedom.

7. In a pulse modulation system wherein recurring alternating current pulses of constant amplitude and constant duration and of varying occurrence time are transmitted, a receiver arrangement including a detector for converting the received alternating current pulses to direct current pulses, a clipper stage coupled to the output of said detector for removing noise ripples from said direct current pulses, a self-restoring trigger circuit coupled to the output of said clipper stage for converting said direct current pulses to longer duration direct current pulses, a multivibrator circuit biased to be in the non-oscillating condition and having its input coupled to the output of said trigger circuit, said trigger circuit furnishing direct current pulses to said multivibrator circuit of such polarity and magnitude as to overcome said bias and enable said multivibrator circuit to oscillate and produce a plurality of pulses for each output pulse from said trigger circuit, a cathode follower coupled to the output of said multivibrator, and a low pass filter coupled to said cathode follower, said filter converting the pulses applied thereto to audio frequency energy of sine wave character.

8. In a pulse modulation system wherein recurring alternating current pulses of constant amplitude and constant duration and of varying occurence time are transmitted, a receiver arrangement including a detector for converting the received alternating current pulses to direct current pulses, a clipper stage coupled to the output of said detector for removing noise ripples from said direct current pulses, a self-restoring trigger circuit coupled to the output of said clipper stage for converting said direct current pulses to longer duration direct current pulses, a multivibrator circuit biased to be in the non-oscillating condition and having its input coupled to the output of said trigger circuit, said trigger circuit furnishing direct current pulses to said multivibrator circuit of such polarity and magnitude as to overcome said bias and enable said multivibrator circuit to oscillate and produce a plurality of pulses for each said direct current output pulse from said trigger circuit, and a low pass filter coupled to the output of said multivibrator for converting the pulses applied thereto to audio frequency energy of sine wave character.

9. A pulse receiver arrangement including a detector for converting received radio pulses to direct current pulses, a trigger circuit coupled to the output of the detector for converting said direct current pulses to longer duration direct current pulses, means for differentiating said longer duration direct current pulses, a vacuum tube normally biased to cut-off and having a grid coupled to said differentiator circuit for passing only differentiated pulses of positive polarity, and a low pass filter coupled to the cathode of said vacuum tube for converting the pulses obtained from said vacuum tube to audio frequency of sine wave character.

10. In a pulse modulation system wherein recurring alternating current pulses of constant amplitude and constant duration and of varying occurrence time are transmitted, a receiver arrangement including a detector for converting the received alternating current pulses to direct current pulses, a self-restoring trigger circuit coupled to the output of said detector for converting said direct current pulses to longer duration direct current pulses, a multivibrator circuit biased to be in the non-oscillating condition and having its input coupled to the output of said trigger circuit, said trigger circuit furnishing direct current pulses to said multivibrator circuit of such polarity and magnitude as to overcome said bias and enable said multivibrator circuit to oscillate and produce a plurality of pulses for each output pulse from said trigger circuit, a cathode follower coupled to the output of said multivibrator, and a low pass filter coupled to said cathode follower, said filter converting the pulses applied thereto to audio frequency energy of sine wave character.

11. A pulse receiver arrangement including a detector for converting received radio pulses to direct current pulses, a trigger circuit coupled to the output of the detector for converting said direct current pulses to longer duration direct current pulses, means for differentiating said longer duration direct current pulses, a circuit coupled to said differentiator circuit for passing only differentiated pulses of a single polarity, and a low pass filter coupled to said last circuit for converting the pulses received therefrom to audio frequency of sine wave character.

JOHN B. ATWOOD.
GRANT E. HANSELL.

REFERENCES CITED

The following references are of record in the file of this patent:

UNITED STATES PATENTS

| Number | Name | Date |
|---|---|---|
| 2,113,214 | Luck | Apr. 5, 1938 |
| 2,116,501 | Armstrong | May 10, 1938 |
| 2,239,757 | Sanders | Apr. 29, 1941 |
| 2,262,838 | Deloraine et al. | Nov. 18, 1941 |
| 2,266,401 | Reeves | Dec. 16, 1941 |
| 2,381,928 | Roberts | Aug. 14, 1945 |
| 2,393,971 | Busignies | Feb. 5, 1946 |
| 2,398,490 | Atwood | Apr. 16, 1946 |
| 2,402,916 | Schroeder | June 25, 1946 |
| 2,409,577 | Matson | Oct. 15, 1946 |
| 2,410,000 | Anderson | Oct. 29, 1946 |
| 2,410,233 | Percival | Oct. 29, 1946 |
| 2,416,328 | Labin | Feb. 25, 1947 |
| 2,419,569 | Labin et al. | Apr. 29, 1947 |
| 2,425,314 | Hansell | Aug. 12, 1947 |
| 2,430,139 | Peterson | Nov. 4, 1947 |
| 2,441,957 | De Rosa | May 25, 1948 |
| 2,444,455 | Labin | July 6, 1948 |